Sept. 3, 1929.  E. C. NEWCOMB ET AL  1,726,712
BRAKE
Filed May 14, 1927   2 Sheets-Sheet 1
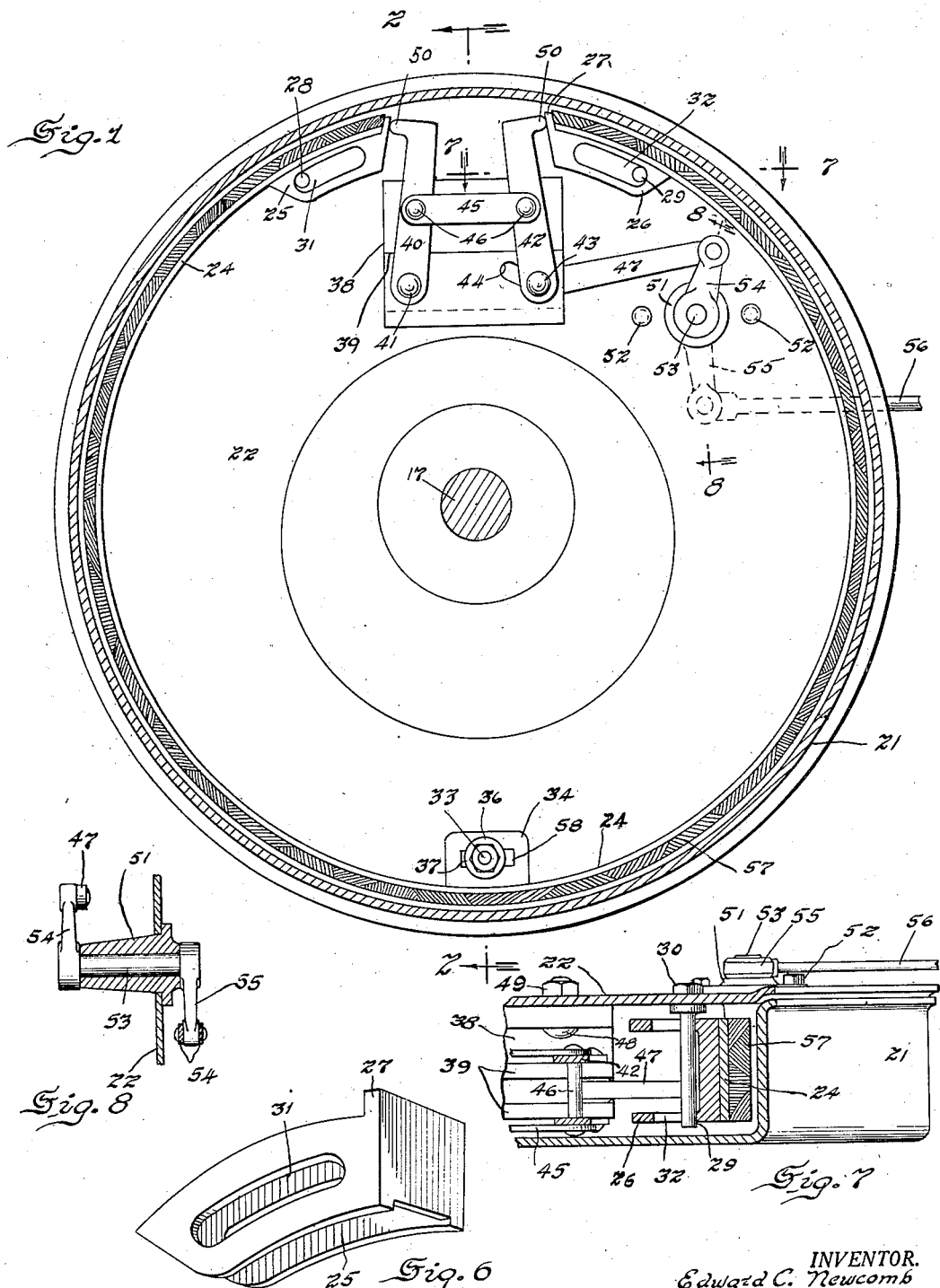
INVENTOR.
Edward C. Newcomb
Edward O. Reynolds
BY 
ATTORNEYS.

Sept. 3, 1929.  E. C. NEWCOMB ET AL  1,726,712
BRAKE
Filed May 14, 1927   2 Sheets-Sheet 2
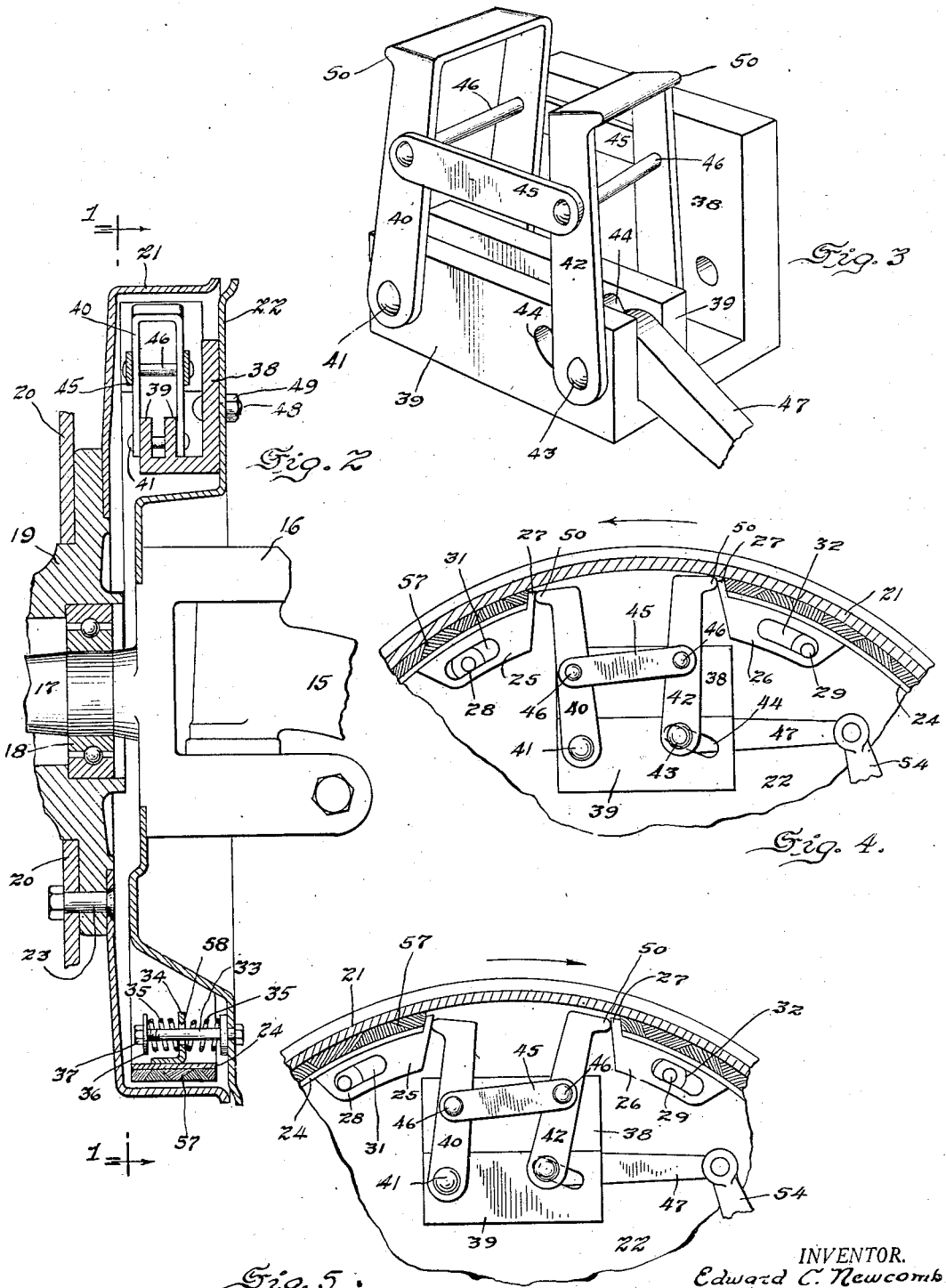
INVENTOR.
Edward C. Newcomb
Edward O. Reynolds
BY P. W. Pomeroy
ATTORNEYS.

Patented Sept. 3, 1929.

1,726,712

UNITED STATES PATENT OFFICE.

EDWARD C. NEWCOMB AND EDWARD O. REYNOLDS, OF SOUTH BEND, INDIANA, ASSIGNORS TO THE STUDEBAKER CORPORATION, OF DETROIT, MICHIGAN, A CORPORATION OF NEW JERSEY.

BRAKE.

Application filed May 14, 1927. Serial No. 191,417.

This invention relates to vehicle brakes and particularly to the operating mechanism therefor, and in the following specification, that part of the brake mechanism which is engageable with the brake drum will often be referred to as the brake.

In order to obtain the maximum efficiency of an internal floating type brake shoe or band, it is essential that the pressure applied in expanding the brake element be exerted in a circumferential direction directly against the ends of the brake. Heretofore, considerable difficulty has been encountered in obtaining actuating mechanisms which would satisfactorily apply pressure to the ends of the brake in this manner. A rotatable cam positioned between brackets secured to the ends of the brake has been quite extensively used with internal brakes, but the operation of the same does not permit pressure to be applied in a true circumferential direction to expand the brake, as the lines of contact of the cam with the brake end brackets are usually offset from the circular path of the brake. Upon rotation of the cam, one end of the brake is forced toward the brake drum and the other end thereof is drawn from the drum, causing an uneven distribution of pressure to the brake drum. Radially acting wedges or toggle arrangements are frequently used, but they, too, are not efficient in their operation as they force the ends of the brake into contact with the drum before the remainder thereof, thereby producing excessive braking action at the ends of the brake which encourages chattering and seizing of the brake with the drum. Uneven wearing of the brake facing also results from the uneven application of the braking pressure just described in both constructions.

It can be seen from the foregoing description of the brake expanding mechanisms heretofore used, that the real advantages of a floating type internal brake are sacrificed. It is, therefore, the principal object of this invention to provide an internal type brake with an expanding mechanism which will apply pressure to the ends of the brake in a true circumferential direction.

Another object is to provide an internal expanding brake with a floating band which will be as efficient in operation when the vehicle is moving rearwardly as when the vehicle is moving forwardly.

Another object is to provide an internal type floating brake with means for applying pressure to the ends of the brake in a circumferential direction for expanding the same to enable a brake of lighter and more flexible construction to be used.

Another object is to provide an internal floating brake with an expanding mechanism which will permit pressure to be applied in a circumferential direction substantially in the circular path of the brake for expanding the same.

Another object is to provide an expanding floating brake with an expanding mechanism comprising a system of levers which will apply pressure to one end of the brake in a circumferential direction when the brake drum is rotated in one direction and which will apply equally as efficient pressure to the other end of the brake when the brake drum is rotated in the opposite direction.

A further object is to provide an internal floating band brake with a band expanding mechanism comprising a lever pivotally mounted at its lower extremity and engaging one end of the brake band substantially in its circular path at the upper extremity, a second lever slidably supported at its lower extremity and engaging the other end of the brake band in its circular path at its upper extremity, a connecting link pivoted to the levers between their extremities, and means for slidably moving the second mentioned lever at its lower extremity, whereby movement of the lower extremity of the second lever will cause pressure to be exerted against the ends of the brake band by their adjacent levers in a circumferential direction, the direction of rotation of the brake drum determining which end of the band will be moved for expanding the brake band.

These being among the objects of the present invention, the same consists of certain features of construction and combinations of parts to be hereinafter described with reference to the accompanying drawings and then claimed, having the above and other objects in view.

In the accompanying drawings which illustrate a suitable embodiment of the present invention, Figure 1 is a side view of a vehicle brake taken on the line 1—1 of Figure 2, showing the brake expanding mechanism in inoperative position.

Figure 2 is a transverse section taken on the line 2—2 of Figure 1 and through the left front wheel of a motor vehicle.

Figure 3 is an enlarged perspective view of the brake band expanding mechanism.

Figure 4 is a partial side view of the brake drum and brake band showing the position of the expanding mechanism when the brake drum is rotated in a counter clockwise direction.

Figure 5 is a view similar to Figure 4 showing the position of the band expanding mechanism when the brake drum is rotating in a clockwise direction.

Figure 6 is an enlarged perspective view of one of the stop engaging brackets.

Figure 7 is a section taken on the line 7—7 of Figure 1.

Figure 8 is a section taken on the line 8—8 of Figure 1.

Although the brake operating mechanism of this invention is particularly adaptable to an internal band brake of the free floating type and for convenience is described as such, it is to be understood that the operating mechanism may be applied to any brake of the floating type having a plurality of pivoted shoes or bands.

Referring to the accompanying drawings, in which like numerals refer to like parts throughout the several views, and particularly to Figure 2, conventionally pivoted to a motor vehicle front axle 15 is a steering knuckle 16 having an outwardly extending stub axle 17 formed thereon. The stub axle 17 carries bearings 18 which rotatably support a wheel hub 19 to which a vehicle wheel 20 and a brake drum 21 are concentrically secured by bolts 23. A brake drum dust cover 22 is rigidly attached to the steering knuckle 16 in close relationship to the brake drum 21 to exclude as much dirt and the like as possible.

Concentrically arranged within the brake drum 21 is a split expandable band 24 of spring steel faced with a suitable friction material 57, the ends of the band 24 having the end brackets 25 and 26 secured thereto, one of which is shown in perspective in Figure 6. Each of the brackets is formed with a curved surface which seats against the inside of the band end and with a lip 27 projecting upwardly therefrom, which seats against the transverse end portion of the band 24. The brake band 24 is free to move a predetermined amount in a circumferential path and is suspended on stop pins 28 and 29 which are secured to the dust cover 22 by nuts 30. The stop pins 28 and 29 extend through elongated slots 31 and 32 respectively formed in the brackets 25 and 26, as shown in Figure 7, the ends of the slots 31 and 32 farthest disposed from the ends of the brake band 24 being seated against the stop pins 28 and 29 when the brake mechanism is in inoperative position, as illustrated in Figure 1.

Secured to the dust cover 22 substantially 180° from a plane bisecting the distance between the pins 28 and 29 is a third pin 33 which extends through an elongated slot 58 provided in an angle bracket 34 secured to the inner face of the band 24. Coil springs 35 are positioned on the pin 33 at each side of the bracket 34 and are set in compression by a washer 36 and a nut 37 threaded on the end of the pin 33. The compression springs 35 bear against each side of the bracket 34 to keep the brake band 24 transversely centered in relation to the brake drum 21, that is, they prevent transverse movements of the brake band 24 relative to the brake drum 21.

The brake expanding mechanism is preferably constructed as a unitary assembly which is shown in side elevation in Figure 1 and in perspective in Figure 3. This assembly comprises a supporting member 38 substantially U-shaped in form, one of the upwardly extending legs which is of less height than the other being bifurcated to provide a channel-shaped portion having two spaced parallel walls 39. An inverted U-shaped lever 40, having the lower extremities of its legs positioned outwardly of the channel-shaped portion of the support 38 is pivoted on a pin 41 extending through the parallel walls 39. A similar lever 42 has the lower extremities of its legs positioned outwardly of the channel-shaped portion of the other end of the support 38 and has its legs connected at their lower extremities by a pin 43 which is slidably and pivotally guided by slots 44 formed in the parallel walls 39. Links 45 are pivoted at their ends on pins 46 extending centrally through the sides of the U-shaped levers 40 and 42 to pivotally connect the same. Positioned between the parallel walls 39 and pivoted on the pin 43, connecting the legs of the lever 42, is an actuating link 47, the purpose of which will be described later in the specification.

The expanding mechanism assembly is attached to the brake drum dust cover 22 by bolts 48 extending through the longer leg of the support 38 and nuts 49 threaded on to the bolts 48 which draw the support 38 firmly against the dust cover 22. Outwardly projecting hardened lips 50 formed at the bases of the U-shaped levers 40 and 42 engage with the upwardly projecting lips 27 of the brake band end brackets 25 and 26 to expand the brake. The lines of contact of the lips 50 of the levers 40 and 42 and the lips 27 of the brackets 25 and 26 lie substantially in the circumferential path of the brake band 24, the significance of which will be clearly understood in the following description of the operation of the brake mechanism.

A bracket 51 is secured by bolts 52 to the brake drum dust cover 22 to rotatably support a shaft 53 which extends through the dust cover 22. The shaft 53 has a lever 54 secured to one end thereof which is pivotally connected to the end of the previously mentioned actuating link 47 and has an arm 55 secured to the other end which is pivotally connected to a brake rod 56 that is operated by a suitable pressure applying means such as a brake pedal.

The operation of the brake expanding mechanism will be first described when the vehicle wheel and consequently the brake drum 22 is rotating in a clockwise direction and then when the drum is rotating in a counter clockwise direction. Referring to Figure 1, which shows the brake mechanism in inoperative position and the Figure 5, which indicates the operative position of the mechanism when the brake drum 21 is rotating in a clockwise direction, it will be seen in Figure 1, that the stop pins 28 and 29 are substantially at the ends of the slots 31 and 32 farthest away from the ends of the bank band 24. Now, with the brake drum 21 rotating in a clockwise direction and with the braking pressure applied through the lever 54 and the actuating link 47 to the lower extremity of the lever 42, the pin 43 will be moved in the slots 44 in the parallel walls 39 of the support 38, which causes the lever 42 to pivot about the link pin 46. In pivoting about this pin, the upper extremity of the lever 42 swings in a clockwise direction and the upper extremity of the lever 40 swings in a counter clockwise direction about its pivot pin 41, the pressure moving this lever being carried from the lever 42 by the links 45. The upper ends of the levers 40 and 42 thus move away from each other to spread the ends of the brake band 24 until the band engages slightly with the rotating brake drum 21. At the instant that the brake band facing 57 starts to engage the drum 21, the band 24 is rotated until the stop pin 28 strikes the end of the slot 31 farthest from the end of the band 24. The operation of the brake mechanism just described is that of initial expansion of the band 24. Full braking pressure is now applied, which causes pressure for expanding the band 24 to be exerted solely through the movement of the lever 42 which pivots about the link pin 46 in a clockwise direction, the sole movement of the lever 42 being caused by the inoperativeness of the lever 40 after initial expansion of the band which engages the band end bracket 25 that is held against further movement of the stop pin 28. The lip 50 of the lever 42 contacts with the lip 27 of the band end bracket 26 substantially in the circular path of the brake 24 so that the pressure exerted thereagainst forces the band 24 to expand in a true circumferential direction. It can be easily understood that a brake band which is expanded circumferentially is more efficient than one in which the ends of the band are brought into contact with the brake drum before the remainder thereof. When the braking pressure is released, the band 24 disengages itself from the drum 21 and the operating mechanism assumes the inoperative position shown in Figure 1.

One particular advantage of the present invention is that the brakes are equally as efficient when the vehicle is moved rearwardly as when it is moved forwardly. In Figure 4, the operative position of the parts of the brake operating mechanism is shown when the vehicle is moving forwardly, that is when the brake drum 21 is rotating in a counter clockwise direction. Initial expansion of the band 24 occurs in the same manner as previously described with the exception that the band rotates a slight amount in a counter clockwise direction and the stop pin 29 seats against the end of the slot 32 farthest from that end of the band. In this case, after the initial expansion of the band 24, pressure applied through the actuating link 47 causes the lower extremity of the lever 42 to swing in a clockwise direction about the line of contact between the lip 50 of the lever 42 and the band end bracket 26 as an axis and thereby apply pressure through the links 45 which tend to rotate the lever 40 about its pivot pin 41 to move the end of the band 24 in a circumferential direction for complete engagement thereof with the brake drum 21. The expanding pressure in this case is also applied at the end of the band 24 in a line substantially in the circular path of the brake band 24.

From the foregoing description, the advantages of the brake construction covered by the present invention over constructions heretofore used are readily apparent. It can be seen that pressure is applied to the ends of the brake band in such a manner that the band is expanded in a true circumferential direction so that the maximum efficiency may be derived from its engagement with the brake drum.

It is to be understood that the present invention is not limited to the exact construction shown in the drawings, but may include any construction which applies pressure to the ends of a brake in a true circumferential direction and it is also to be understood that formal changes may be made in a specific embodiment of the invention described without departing from the spirit and substance of the broad invention, the scope of which is commensurate with the appended claims.

What we claim is:

1. In a braking mechanism, a rotatable drum, a dust cover therefor, braking means engageable with said drum, a pair of pivoted levers supported by said dust cover within said drum engageable with the ends of said braking means substantially in the circular path thereof for moving said braking means to engage said drum, one of said levers having a shiftable pivot point, and the other of said levers having a fixed pivot point, a link pivotally connecting said levers, and means for actuating said levers.

2. In a braking mechanism, a rotatable drum, a dust cover therefor, braking means engageable with said drum, a lever pivotally supported by said dust cover engageable with one end of said braking means substantially in the circular path thereof, a link pivoted to said lever, a second lever supported by said dust cover engageable with the other end of said braking means substantially in the circular path thereof, said second lever being pivoted between its ends to said link, and means for actuating said levers for moving said braking means to engage said drum.

3. In a brake mechanism, a rotatable drum, a dust cover therefor, braking means engageable with said drum, a support carried by said dust cover, a lever pivoted on said support, a second lever slidable on said support, said levers engaging the ends of said braking means, a link pivotally connecting said levers, and means for actuating said levers for moving said braking means to engage said drum.

4. In a braking mechanism, a rotatable drum, braking means engageable therewith, a pair of levers engaging the ends of said braking means, a link pivotally connecting said levers, a support pivotally supporting one of said levers and slidably supporting the other of said levers, and means for sliding said last-mentioned lever along its support for actuating said levers for moving said braking means to engage said drum.

5. In a brake mechanism, a rotatable drum, braking means engageable therewith, a pair of levers engaging the ends of said braking means, a link pivotally connecting said levers, a support pivotally supporting one of said levers and slidably supporting the other of said levers, a rotatable bell crank, an arm pivotally connecting said bell crank and said slidably supported lever whereby rotation of said bell crank moves said slidably supported lever along said support for causing both of said levers to move said braking means to frictionally engage said drum.

6. In a brake mechanism, a rotatable drum, a free floating brake element therein engageable therewith, a dust cover for said drum, and means supported by a member carried by said dust cover for applying pressure to the ends of said element in a direction circumferentially of said drum to expand the same, said means comprising a pair of levers pivotally connected between their ends by a cross link and engageable with the ends of said element substantially in the circular path thereof, one of said levers also being pivoted at its lower extremity to said member, and means for actuating said levers.

7. In a brake mechanism, a rotatable drum, a free floating circular flexible brake element engageable therewith, a dust cover for said drum, and means supported by a member carried by said dust cover for applying pressure to the ends of said element in a direction circumferentially of said drum and substantially in the circular path of said element to expand said element, said means comprising a pair of levers pivotally connected between their ends by a cross link, one of said levers also being pivoted to said member at its lower extremity and the other of said levers having a shiftable pivot point, and means for actuating said levers.

8. In a brake mechanism, a rotatable drum, a free floating circular brake band engageable therewith, a dust cover for said drum, means for applying pressure to the ends of said band circumferentially thereof, said means comprising a support carried by said dust cover, a lever pivoted to said support, a lever slidable on said support, a link pivotally connecting said levers, the upper extremities of said levers engaging the ends of said band substantially in the circular path thereof, and means for actuating said levers.

9. In a brake mechanism, a rotatable drum, a flexible free floating circular brake band engageable therewith, a pair of inverted U-shaped levers, the upper ends thereof engaging the ends of said band substantially in the circular path thereof, a cross link pivoted to said levers, a support pivotally supporting the lower end of one of said levers and slidably supporting the lower end of the other of said levers, and means for sliding the lower end of said last-mentioned lever on said support for moving said levers to expand said band into engagement with said drum.

10. In combination with a brake drum and a split circular band engageable therewith, a band expanding mechanism comprising a pair of U-shaped levers engageable with the ends of said band substantially in the circular path thereof, cross links pivoted to the sides of said levers between the extremities thereof, a support having a channel-shaped portion slidably supporting one of said levers and pivotally supporting the other of said levers, the sides of said levers being positioned outwardly of said channel-shaped portion, and an actuating arm positioned in said channel-shaped portion and pivoted to said slidably supported lever whereby movement of said actuating arm pivots said levers to circumferentially expand said band into engagement with said drum.

11. In a brake mechanism, a rotatable drum, a split circular brake element engageable therewith, a dust cover adjacent said drum, a pair of levers having their upper ends engageable with the ends of said brake element substantially in the circular path thereof, a cross link pivoted to said levers, a support mounted on said dust cover pivotally supporting the lower end of one of said levers and slidably supporting the lower end of the other of said levers, a rotatable bell crank mounted on said dust cover, an arm connecting said bell crank and the lower end of said slidably supported lever, and means for actuating said bell crank for sliding the lower end of said last-mentioned lever for moving both of said levers to expand said band into engagement with said drum.

12. In a brake mechanism, a rotatable drum, a free floating band engageable therewith having slots adjacent the ends thereof, a dust cover adjacent said drum, stop pins mounted thereon extending through said slots, a pair of levers engaging the ends of said band substantially in the circular path thereof, a support pivotally supporting one of said levers and slidably supporting the other of said levers, a link pivotally connecting said levers between their respective ends, a bell crank rotatably mounted on said dust cover, an arm pivotally connecting said bell crank and the lower end of said slidably supported lever, and means for rotating said bell crank to move said arm for sliding the lower end of said lever on said support for pivoting said levers to expand said band to engage said drum, whereby said band is rotating until one of said stop pins engages an end of its slot in the end of said band, further rotation of said bell crank causing one of said levers to expand said band in a circumferential direction for further engagement with said drum.

13. In a brake mechanism, a rotatable drum, a free floating brake band engageable therewith having slots adjacent the ends thereof, a dust cover adjacent said drum, stop pins mounted thereon extending through said slots, a support secured to said dust cover, a lever pivoted to said support, the upper end thereof engaging an end of said band substantially in the circular path thereof, an inverted U-shaped lever, a pin extending through the sides of said U-shaped lever and through slots in said support, the upper end of said U-shaped lever engaging the other end of said band substantially in the circular path thereof, a link pivotally connecting said levers, a bell crank mounted on said dust cover, an arm pivotally connecting said bell crank and said pin extending through the sides of said U-shaped lever, and means for rotating said bell crank to slide said pin in said slots of said support for moving said levers to expand said band to engage said drum whereby said band is rotating with said drum until one of said stop pins engages an end of its slot in the end of said band, further movement of said bell crank causing one of said levers to pivot for expanding said band in a direction circumferentially of said drum for further engagement therewith.

14. In a brake mechanism, a rotatable drum, a dust cover therefor, braking means engageable with said drum, a lever having a fixed pivot and a lever having a movable pivot, each lever being supported by said dust cover within said drum and engageable with the ends of said braking means substantially in the circular path thereof for moving said braking means to engage said drum, and means for actuating said levers.

15. In a brake mechanism, a rotatable drum, a dust cover therefor, a free floating brake element within said drum engageable therewith, means comprising a pair of levers supported by said dust cover movable in substantially parallel paths engageable with the ends of said element for applying pressure thereto in a direction circumferentially of said drum to expand the same, and means for actuating said levers.

Signed by us at South Bend, Indiana, this 12th day of May, 1927.

EDWARD C. NEWCOMB.
EDWARD O. REYNOLDS.